United States Patent [19]

Ramseier

[11] Patent Number: 4,832,973
[45] Date of Patent: May 23, 1989

[54] PROCESS FOR PRODUCING CHARACTERS OR SYMBOLS ON CHEESE AND CHEESE PRODUCTS

[75] Inventor: Ernst Ramseier, Bern, Switzerland

[73] Assignee: Schweizerische Käseunion AG, Bern, Switzerland

[21] Appl. No.: 91,743

[22] Filed: Aug. 31, 1987

[30] Foreign Application Priority Data

Sep. 4, 1986 [CH] Switzerland ................. 03553/86

[51] Int. Cl.[4] ............................................. A23C 19/00
[52] U.S. Cl. ................................... 426/383; 426/87
[58] Field of Search ................................ 426/383, 87

[56] References Cited

U.S. PATENT DOCUMENTS 1,856,530  5/1932  Barghausen ................. 426/383
4,433,621  2/1984  Van Wyk .................... 426/383

Primary Examiner—Donald E. Czaja
Assistant Examiner—Helen Pratt
Attorney, Agent, or Firm—Werner W. Kleeman

[57] ABSTRACT

A discoloration in a marginal zone of the cheese or cheese product is produced by locally limited heat or thermal action of predetermined duration and with a treatment temperature between the plasticity temperature and the combustion or burning temperature of the products. In this way there can be effectively applied a marking, such as desired characters or symbols on the cheese or cheese product.

14 Claims, 1 Drawing Sheet

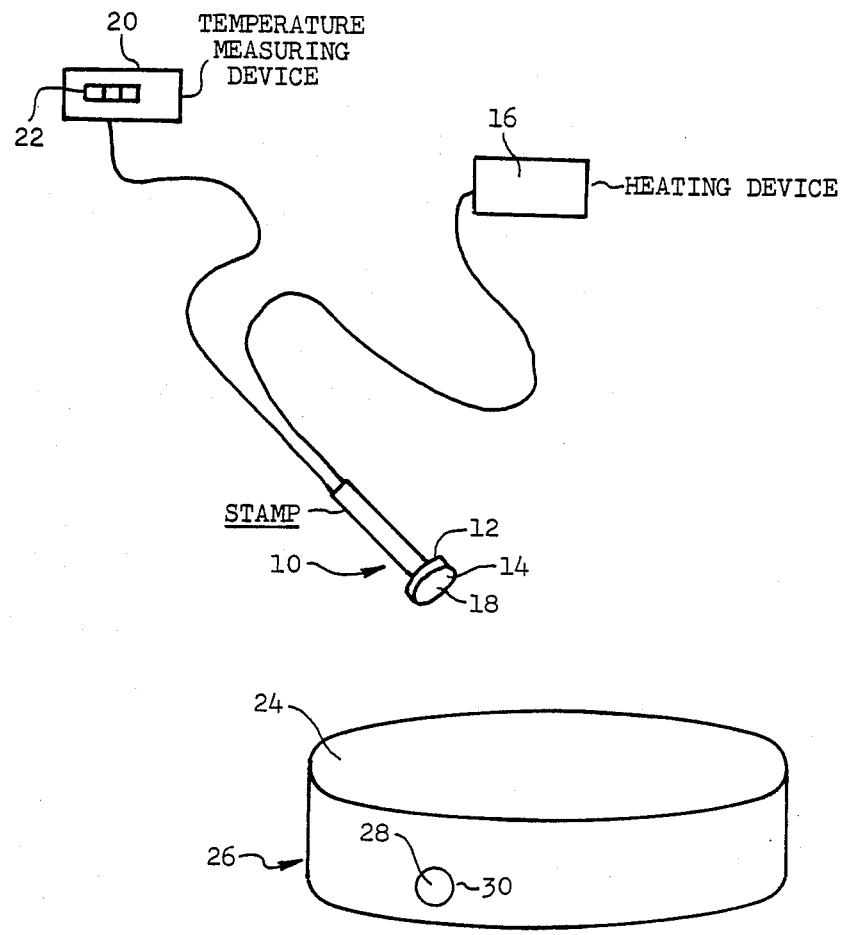

PROCESS FOR PRODUCING CHARACTERS OR SYMBOLS ON CHEESE AND CHEESE PRODUCTS

BACKGROUND OF THE INVENTION

The present invention relates to a new and improved process for producing markings, such as characters or symbols on food products, especially cheese and cheese products.

Markings appear on the surface of cheeses, which are marketed in the form of whole cheeses or parts thereof, in order to refer to the origin or name, genuineness and characteristics of the product. Thus, for example, it is known to effect marking by printing with ink or by sticking labels onto the whole cheese rind. Although these markings have the advantage that they can be seen in the retail trade even sometimes up to the final consumer, there are nowadays objections to the various types of markings employed due to the use of foreign substances to perfect the same. On the other hand, markings which merely appear on the package for the products do not fulfill the desired function, because they are frequently lost during transit to the retail outlet.

SUMMARY OF THE INVENTION

Therefore, with the foregoing in mind it is a primary object of the present invention to provide an improved process for producing desired markings, such as characters or symbols on food products, particularly cheese and cheese products, in a highly effective and reliable fashion without affecting the quality or taste of the thus marked food product.

A further noteworthy and significant object of the present invention is to provide a process for producing markings, such as characters or symbols on cheese and cheese products, which renders superfluous the use of foreign substances by activating natural characteristics of the product and produces a marking which can be seen up to the final consumer.

Another significant object of the present invention is directed to application of markings, such as characters or symbols on cheese and cheese products in an extremely simple and reliable fashion, requiring a minimum of equipment expenditure and effort, wherein the product marking operation is accomplished without affecting the taste of the marked product and without the need to use foreign substances for achieving product marking.

Now in order to implement these and still further objects of the invention which will become more readily apparent as the description proceeds, the inventive process for producing characters or symbols on cheese or cheese products contemplates producing a discoloration in a marginal zone of the product by locally limited heat or thermal action of predetermined duration with a treatment temperature between the plasticity temperature and the combustion or burning temperature of the product.

The inventive process beneficially exploits the fact that the substances contained in the cheese or cheese products, under the action of heat or thermal energy, produce a useful discoloration, which is appropriate for providing markings, such as desired characters or symbols. Hereinafter the term "markings" is generally used for broadly encompassing and designating such symbols or characters or other appropriate indicia or inscriptions applied to the products.

According to a preferred embodiment of the inventive process the heat or thermal action is brought about in that contact heat is produced on the product. For this purpose it is, for example, possible to use an electrically heated stamp or punch, which is brought into contact with the product. Preferably the stamp or punch is pressed against the product with a predetermined force and the stamp or punch can be constructed as an embossing stamp or punch, so that the markings are formed both by a discoloration and by embossing deformation.

BRIEF DESCRIPTION OF THE DRAWINGS

The invention will be better understood and objects other than those set forth above will become apparent when consideration is given to the following detailed description thereof. Such description makes reference to the annexed drawing wherein the single FIGURE of the drawing shows an exemplary embodiment of a marking apparatus for the marking of a cheese or cheese products.

DETAILED DESCRIPTION OF THE PREFERRED EMBODIMENTS

Describing now the single FIGURE of the drawing, it is to be understood that to simplify the showing thereof, only enough of the marking apparatus or equipment for producing markings, such as characters or symbols or the like on cheese and cheese products has been illustrated therein as is needed to enable one skilled in the art to readily understand the underlying principles and concepts of this invention.

With reference to this single FIGURE of the drawing there will now be described three embodiments of the inventive process or method in greater detail. For all the embodiments under discussion use is made of contact heat and product surface deformation. To this end, use was made of an embossing or marking stamp or punch 10, for instance, constituting a brass stamp or punch 12, which had an effective stamp or punch surface 14 of 25 cm$^2$. Using a conventional regulatable electric heating device 16, the stamp or punch 12 could be heated to a temperature of maximum 650° C.

The punch temperature could be detected by using a standard surface sensor 18 and was monitored on a digitally displaying temperature measuring device or means 20 having a suitable digital display 22.

According to the first embodiment, the process was carried out on the well known Swiss Emmentaler cheese in the form of an unpurified or uncleaned or unwashed whole cheese. The stamp or punch 12 heated to approximately 440° C. was pressed against the surface zone constituted by the cheese rind 24 of the cheese or cheese product, generally indicated by reference character 26, with a force of about 40N. After approximately 1.1 sec., the stamp or punch 12 was removed from contact with the rind 24 of the cheese or cheese product 26, the punch contact being made at a desired marginal or surface zone or region of the product surface as shown in the drawings.

A sharp image 28 of the punch 12 appeared on the cheese rind 24, on the one hand, as a discoloration and on the other hand, as a rind surface deformation. The punch image 28 had a golden brown color, which was clearly distinguished from the pale yellow color of the untreated rind 24. This image 28 was depressed by approximately 0.5 mm compared with the untreated surface of the rind 24, the edges being surrounded by a bead-like protuberance 30, with a width of approximately 1.5 mm and a height between 0.5 and 0.6 mm. This sharp image 28 can be of substantially linear configuration or areal or surface-like configuration and can be applied to any predeterminate region or surface zone of the cheese or cheese product 26, for instance, the peripheral zone thereof.

A cut through the rind revealed a discoloration to a depth of approximately 1.0 mm. After storing the cheese or cheese product 26 for 90 days, taste samples were taken from a depth between approximately 2 and 4 mm below the surface of the rind 24 of the whole cheese or cheese product 26 from marked and unmarked portions. A comparison failed to reveal any differences as regards odor or taste between them.

In the second embodiment, the process was performed on a purified or cleaned or washed whole Emmentaler cheese.

The stamp or punch 12 once again heated to a temperature of approximately 440° C. was pressed onto the cheese rind 24 with a force of about 40N and was then removed therefrom after a pressing time of approximately 0.8 sec. The result was almost identical to that of the first embodiment described above and the color and depth of the image 28 were the same.

The taste sample obtained in the same way as in the first embodiment failed to reveal any differences.

The third embodiment used a likewise well known Greyerzer cheese in the form of a purified or cleaned or washed whole cheese.

The stamp or punch 12 was heated to a temperature of approximately 480° C. and pressed against the cheese rind 24 with a force of approximately 25N for approximately 1.5 sec.

An image 28 of the stamp or punch 12 appeared in the whole cheese or cheese product 26 in a golden brown color. The punching or stamping depth was approximately 0.4 mm and the depression was bordered by a small bead-like protuberance 30. The image 28 could clearly be distinguished with respect to the surface color.

Taste samples obtained in the same way as in the first embodiment failed to reveal any differences and also no color changes were visible in the samples from the marked area.

A large number of tests performed on pieces of rind of different cheese types revealed that the temperature ranges in which the process gives the strived for result are dependent on the type of cheese or cheese product, as well as the presence and characteristics of the rind. However, a favorable range can be determined within the indicated limits for each type of cheese or cheese product and the effective or action time can be kept shorter within such ranges with increasing marking temperature.

The discoloration in the marking, namely the symbol or character produced in the inventive manner shows that a partial decomposition has taken place on the product surface or in a marginal zone or region close to the product surface. Clearly the extent of the decomposition rapidly decreases with the distance from the product surface.

While there are shown and described present preferred embodiments of the invention, it is to be distinctly understood that the invention is not limited thereto, but may be otherwise variously embodies and practiced within the scope of the following claims.

Accordingly, what I claim is:

1. A process for producing markings in the form of characters or symbols on cheese, comprising the steps of:

applying contact heat in the form of a locally limited heating action of predeterminate duration and at a treatment temperature between the plasticity temperature and the combustion temperature of the cheese directly to a predetermined surface zone of the cheese; and producing a discoloration in the predeterminate surface zone of the cheese by the locally limited direct heating action of said predeterminate duration and said treatment temperature which is between the plasticity temperature and the combustion temperature of the cheese, whereby said discoloration takes place without affecting the taste and edibility of the cheese.

2. The process as defined in claim 1, further including the step of:

applying the contact heat at a predeterminate decomposition temperature of the cheese.

3. The process as defined in claim 1, further including the step of:

applying the contact heat in a substantially linear configuration with respect to the surface zone.

4. The process as defined in claim 1, further including the step of:

applying the contact heat in a substantially areal configuration with respect to the surface zone.

5. The process as defined in claim 1, further including the step of:

applying the contact by means of heat the contact heat of a stamp.

6. The process as defined in claim 5, wherein:

there is used as the stamp an embossing stamp.

7. The process as defined in claim 5, further including the step of:

producing a contact pressure between the stamp and the predeterminate surface zone of the cheese.

8. The process as defined in claim 5, further including the step of:

deforming at least the predeterminate surface zone of the cheese by the stamp.

9. The process as defined in claim 6, further including the step of:

deforming at least the predeterminate surface zone of the cheese by an embossment.

10. The process as defined in claim 1, wherein:

the cheese has a rind of a predeterminate thickness; and limiting the predeterminate surface zone exposed to the contact heat to a penetration region which is smaller than the predeterminate thickness of the rind.

11. The process as defined in claim 1, further including the step of:

cleaning the surface of the cheese prior to applying the contact heat.

12. The process as defined in claim 1, wherein:

the contact heat is applied in peripheral zones of a whole cheese or parts thereof.

13. A process for producing markings without the use of any foreign substance, in the form of characters or symbols on a predeterminate integral part of a cheese having a predeterminate plasticity temperature and a combustion temperature, comprising the steps of:

applying contact heat in the form of a locally limited thermal action of predeterminate duration and at a predeterminate treatment temperature between the plasticity temperature and the combustion temperature of the cheese directly to a predeterminate surface zone of the predeterminate integral part of the cheese; and producing a discoloration in the predeterminate surface zone of the predeterminate integral part of the cheese by the direct locally limited thermal action of said predeterminate time duration and said predeterminate treatment temperature which is between the predeterminate plasticity temperature and the predeterminate combustion temperature of the cheese, whereby said discoloration takes place without affecting the taste and edibility of the cheese.

14. The process as defined in claim 13, wherein:

said predeterminate integral part of the cheese to which there is applied contact heat constitutes the rind of the cheese.

* * * * *